Figure 1:
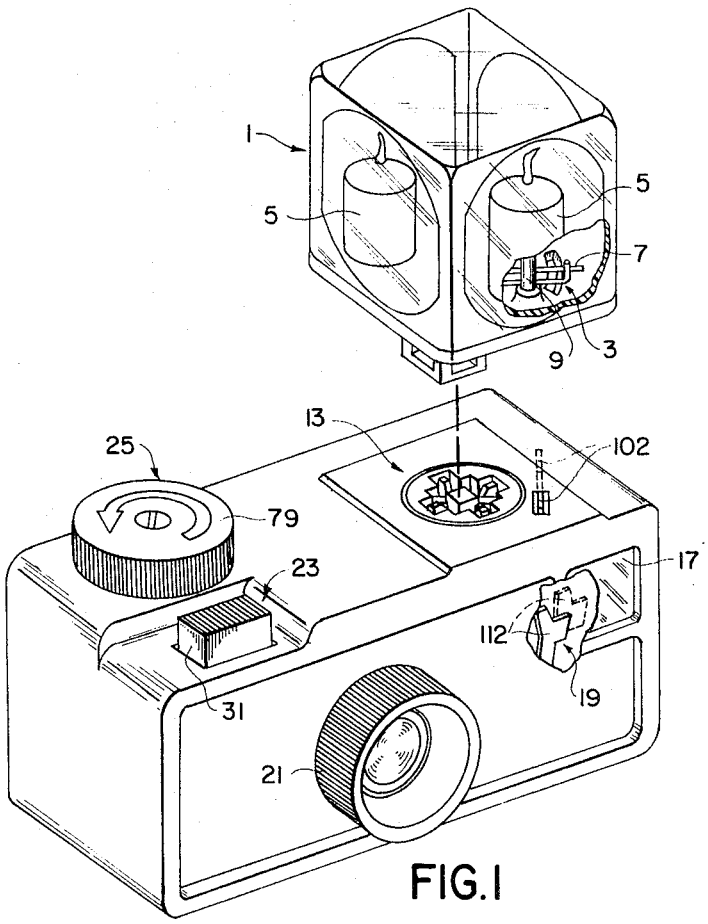
Figure 8:
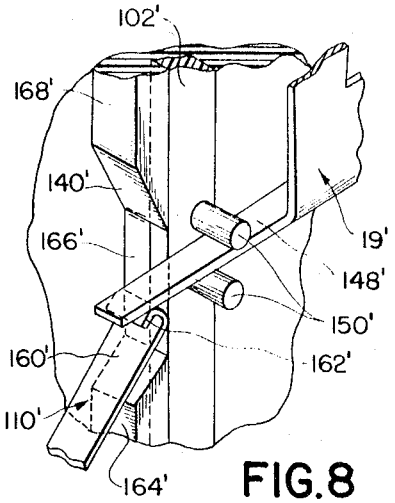
Figure 3:
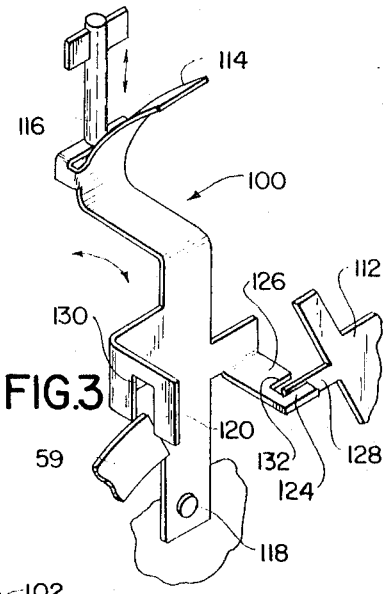
Figure 2:
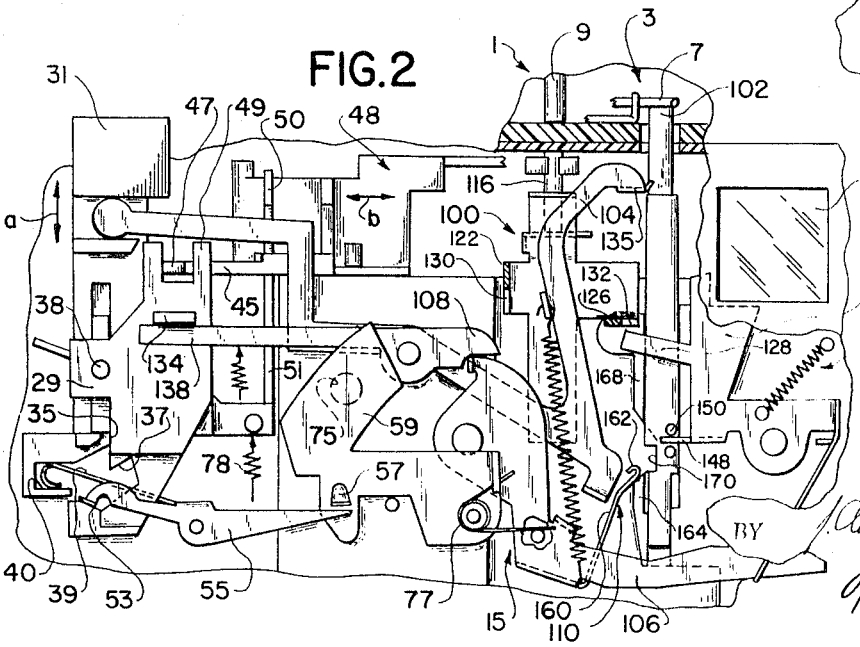
Figure 4:
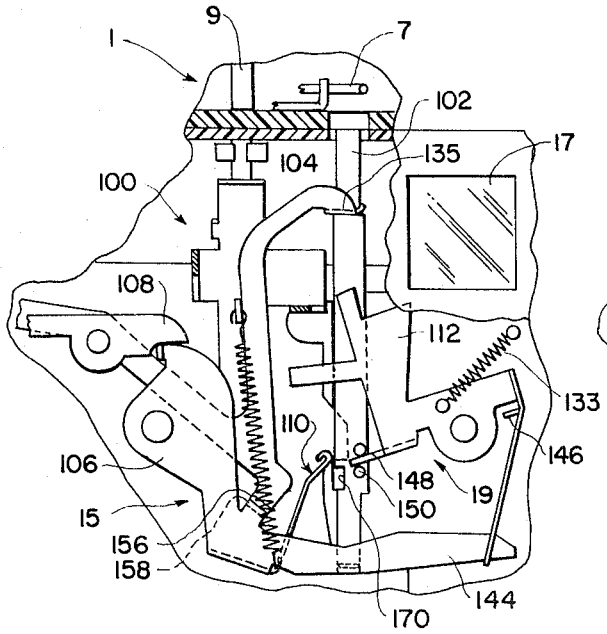
Figure 5:
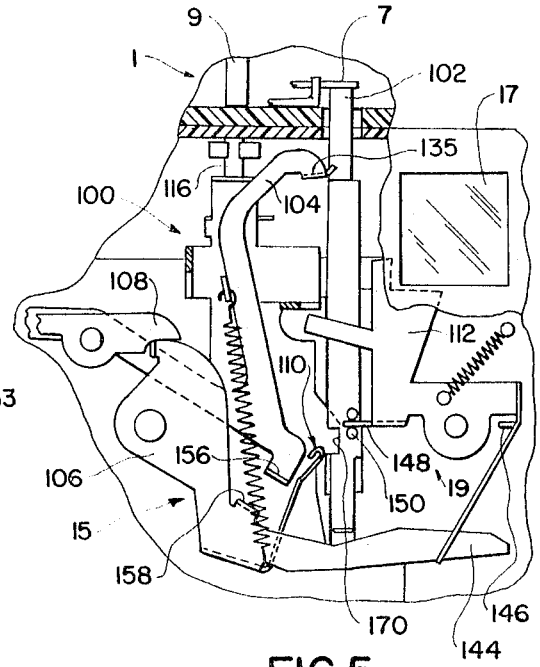
Figure 6:
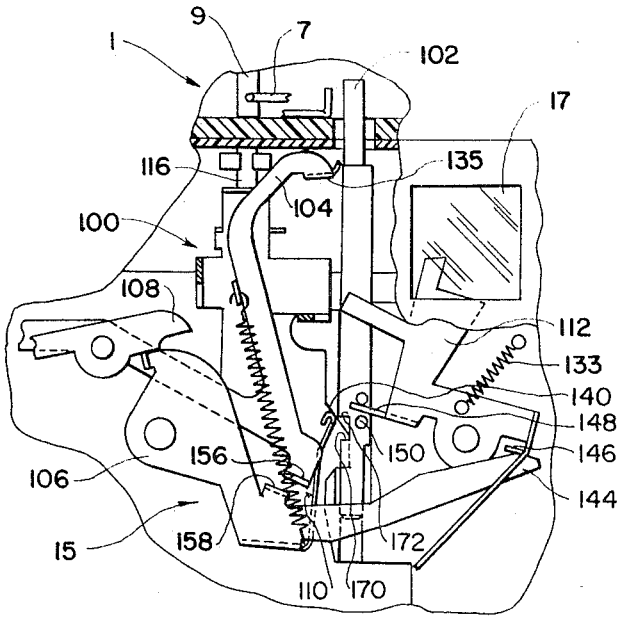
Figure 7:
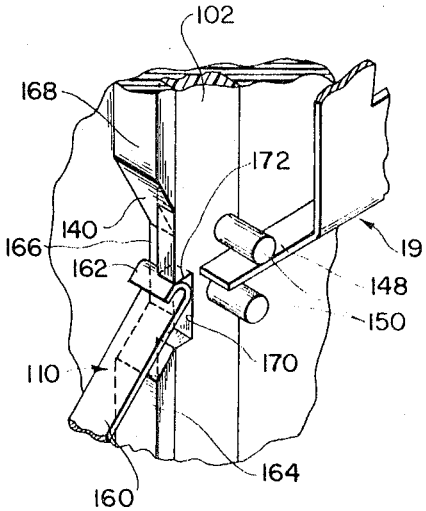

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 22, 1971

887 O.G. 1046

T887,021
ACTUATING MECHANISM FOR MECHANICALLY FIREABLE FLASH DEVICES

Charles E. Pickering and William Windle, Jr., both of 901 Elmgrove Road, Rochester, N.Y. 14650

Filed Apr. 7, 1970, Ser. No. 26,276
Int. Cl. G03b *19/00*
U.S. Cl. 95—11L
2 Sheets Drawing. 18 Pages Specification

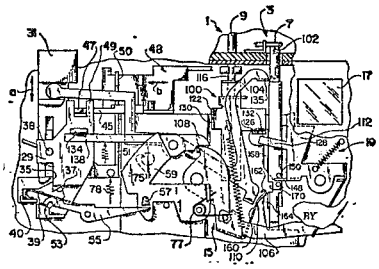

An improved actuating mechanism in apparatus, such as a photographic camera, for sensing the condition of and for firing a percussive flash device. The flash device includes a lamp and a striker (7) lodged in an energized position from which it is releasable to fire the lamp. The apparatus includes an actuating member (102) movable in a first direction to fire the device, and in a second direction to space the member from the device. Energy for moving the actuating member in the first direction is translated from a driver (106) to the actuating member by a coupling lever (110) that first moves into engagement with the actuating member to drive the member in the first direction, and then moves out of engagement with the actuating member to permit return of the member to the second direction.

June 22, 1971 C. E. PICKERING ET AL T887,021

ACTUATING MECHANISM FOR MECHANICALLY FIREABLE FLASH DEVICES

Filed April 7, 1970 2 Sheets-Sheet 1

CHARLES E. PICKERING
WILLIAM WINDLE, JR.
INVENTORS

BY Addison Mathews
Robert W. Hampton
ATTORNEYS

ACTUATING MECHANISM FOR MECHANICALLY FIREABLE FLASH DEVICES

Filed April 7, 1970 2 Sheets-Sheet 2

CHARLES E. PICKERING
WILLIAM WINDLE, JR.
INVENTORS

BY J. Addison Mathews
Robert W. Hampton
ATTORNEYS